United States Patent
Hejlsberg et al.

(10) Patent No.: US 7,657,505 B2
(45) Date of Patent: Feb. 2, 2010

(54) DATA RETRIEVAL FROM A DATABASE UTILIZING EFFICIENT EAGER LOADING AND CUSTOMIZED QUERIES

(75) Inventors: Anders Hejlsberg, Seattle, WA (US); Matthew J. Warren, Redmond, WA (US); Dinesh C. Kulkarni, Sammamish, WA (US); Henricus Johannes Maria Meijer, Mercer Island, WA (US); Terry A. Adams, North Bend, WA (US); Jomo Ahab Fisher, Redmond, WA (US); Daigo Hamura, Bellevue, WA (US); Mads Torgersen, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 394 days.

(21) Appl. No.: 11/624,964

(22) Filed: Jan. 19, 2007

(65) Prior Publication Data

US 2008/0177716 A1    Jul. 24, 2008

(51) Int. Cl.
    *G06F 7/00* (2006.01)
(52) U.S. Cl. .......................................................... 707/2
(58) Field of Classification Search ....................... 707/2
    See application file for complete search history.

(56) References Cited

U.S. PATENT DOCUMENTS

| | | | |
|---|---|---|---|
| 5,799,309 A | 8/1998 | Srinivasan | |
| 5,829,006 A | 10/1998 | Parvathaneny et al. | |
| 6,505,190 B1 | 1/2003 | Harel et al. | |
| 6,728,726 B1 | 4/2004 | Bernstein et al. | |
| 6,728,840 B1 | 4/2004 | Shatil et al. | |
| 6,999,956 B2 | 2/2006 | Mullins | |
| 7,127,463 B2 | 10/2006 | Arnold et al. | |
| 2004/0015516 A1* | 1/2004 | Harter et al. | 707/104.1 |
| 2005/0187926 A1* | 8/2005 | Britton et al. | 707/3 |
| 2006/0212658 A1 | 9/2006 | Hrle et al. | |
| 2007/0027906 A1* | 2/2007 | Meijer et al. | 707/103 R |

OTHER PUBLICATIONS

Widom, J.; Integrating Heterogeneous Databases: Lazy or Eager? 2 pages http://infolab.stanford.edu/~widom/integrating.html.
Chen, Z., et al; Query Optimization in Compressed Database Systems; 2001; 12 pages.

* cited by examiner

*Primary Examiner*—Charles Rones
*Assistant Examiner*—Fazlul Quader
(74) *Attorney, Agent, or Firm*—Workman Nydegger

(57) ABSTRACT

The subject disclosure pertains to systems and methods that facilitate retrieval of data. In particular, an application defined data shape can regulate loading of data for use in an object relational mapping system, enabling the object-oriented application to access data in a relational data base system. Data shapes define policies that control data retrieval, enabling efficient data loading. A data shape allows users to declaratively specify a set of policies to be applied to all queries associated with the data shape. In particular, data shapes can include policies that control eager loading. In addition, data shapes can also include filtering policies intended to reduce or limit data retrieved from a relational database.

19 Claims, 14 Drawing Sheets

DATA RETRIEVAL FROM A DATABASE UTILIZING EFFICIENT EAGER LOADING AND CUSTOMIZED QUERIES

BACKGROUND

Technology advancements and cost reductions over time have enabled computers to become commonplace in society. Enterprises employ computers to collect and analyze data. For instance, computers can be employed to capture data about business customers that can be utilized to track sales and/or customer demographics. In addition, individuals interact with a plurality of non-enterprise computing devices including home computers, laptops and mobile devices (e.g., smartphones and personal digital assistants (PDAs)). As a consequence of computer ubiquity, an enormous quantity of digital data is generated daily by both enterprises and individuals.

Large quantities of such data are housed in one or more databases and/or data warehouses. A database is a collection of data or facts organized in a systematic manner and persisted to a storage device. For example, relational data storage systems (e.g., DB2, SQL Server, MySQL . . . ) are frequently utilized to store relational data and manage these of relationships. A data warehouse is a much larger repository composed of a plurality of databases. In one instance, businesses can store customer information (e.g., name, address, product(s) purchased, date, location . . . ) to one or more data databases. For example, a transactional database can capture current data and aged data can be pushed to a warehouse. In another instance, entity and/or individual web pages can be housed in one or more databases.

The collection and management of such vast amounts of enterprise data provides tremendous opportunities and advantages. Enterprise data can be used to track and control inventory, to predict sales and to determine pricing. Such information can have tremendous value to an organization. For example, a retailer's customer lists are considered a vital business asset.

However, the value of data is directly related to its accessibility. If the data cannot be efficiently retrieved from storage in a manner that allows it to be easily analyzed and processed, the utility of the data is greatly reduced. In addition, long delays or latencies in loading or processing data reduce efficiency and frequently lead to user frustration.

SUMMARY

The following presents a simplified summary in order to provide a basic understanding of some aspects of the claimed subject matter. This summary is not an extensive overview. It is not intended to identify key/critical elements or to delineate the scope of the claimed subject matter. Its sole purpose is to present some concepts in a simplified form as a prelude to the more detailed description that is presented later.

Briefly described, the provided subject matter concerns specification of a data shape that defines rules or policies for data retrieval and enables efficient loading of data from large data sets. According to aspects, data shapes can be used to regulate loading of data for use in an object relational mapping system, enabling an object-oriented application to access data in a relational data base system. Application queries can be managed based upon data shape policies to ensure consistency and increase efficiency. An application can define multiple data shapes, allowing the application to utilize different data shapes for particular purposes. In addition, one or more standardized data shapes can be created and reused.

A data shape can include one or more policies that direct eager loading of data. Data that is likely to be of interest can be identified based upon eager loading policies and retrieved with query results, minimizing repeated data transfers. The eager loading policies can be defined at the time of data shape creation and are applicable to all queries for which the data shape is applicable, providing consistent and efficient loading of data.

A data shape can also include one or more filtering policies that restrict or limit data retrieved from a relational database. Frequently, data queries return unnecessary information resulting in unwanted data transfer and memory use. Filtering policies allow precise specification of limits for data retrieval. In addition, because the filtering policies are applied to all queries for which the data shape is applicable, data consistency is maintained.

To the accomplishment of the foregoing and related ends, certain illustrative aspects of the claimed subject matter are described herein in connection with the following description and the annexed drawings. These aspects are indicative of various ways in which the subject matter may be practiced, all of which are intended to be within the scope of the claimed subject matter. Other advantages and novel features may become apparent from the following detailed description when considered in conjunction with the drawings.

DETAILED DESCRIPTION

Figure 1:
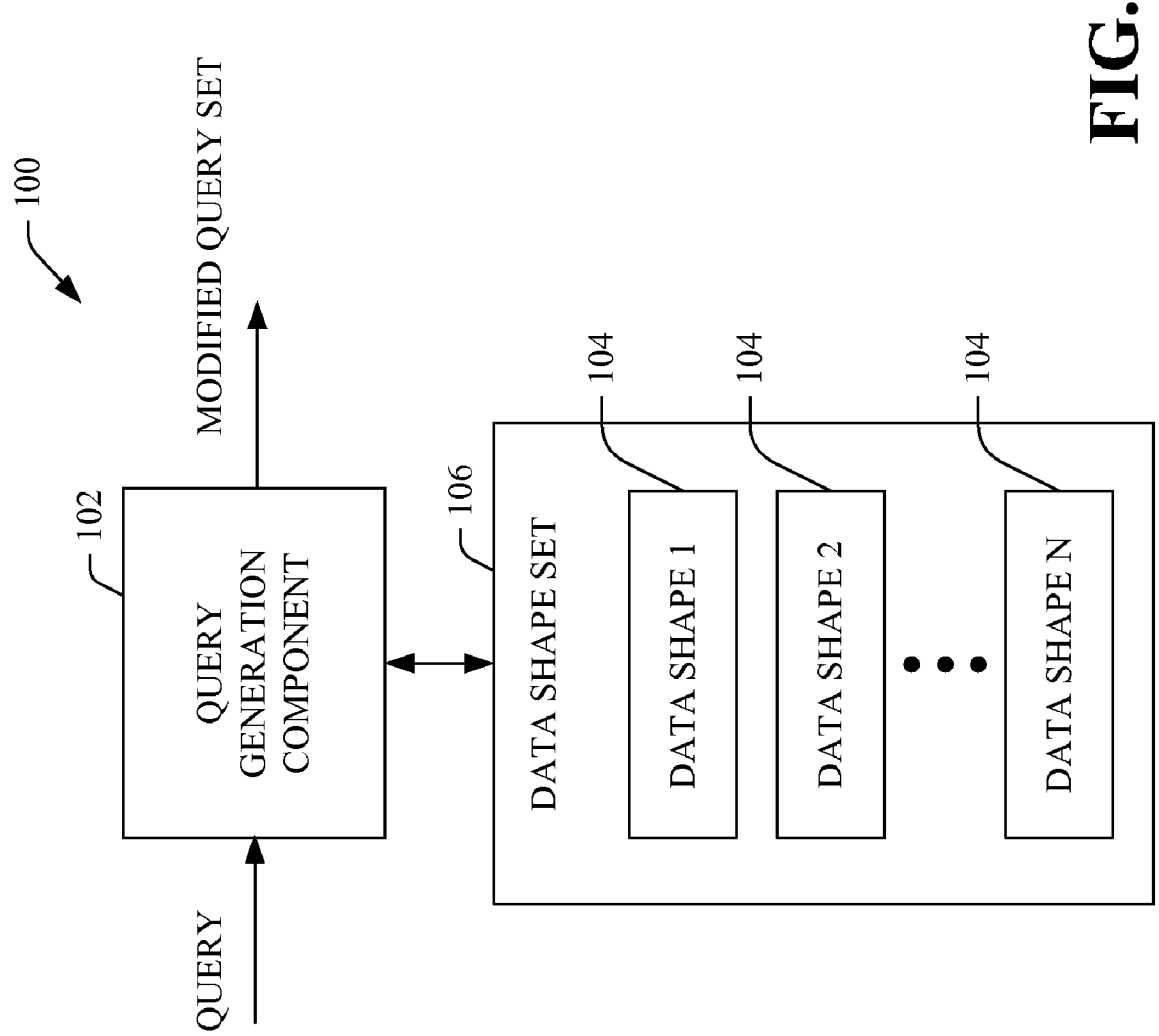
FIG. 1 is a block diagram of a system that facilitates retrieval of data in accordance with an aspect of the subject matter disclosed herein.

The various aspects of the subject matter disclosed herein are now described with reference to the annexed drawings, wherein like numerals refer to like or corresponding elements throughout. It should be understood, however, that the drawings and detailed description relating thereto are not intended to limit the claimed subject matter to the particular form disclosed. Rather, the intention is to cover all modifications, equivalents, and alternatives falling within the spirit and scope of the claimed subject matter.

As used herein, the terms "component," "system" and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component may be localized on one computer and/or distributed between two or more computers.

The word "exemplary" is used herein to mean serving as an example, instance, or illustration. The subject matter disclosed herein is not limited by such examples. In addition, any aspect or design described herein as "exemplary" is not necessarily to be construed as preferred or advantageous over other aspects or designs.

Furthermore, the disclosed subject matter may be implemented as a system, method, apparatus, or article of manufacture using standard programming and/or engineering techniques to produce software, firmware, hardware, or any combination thereof to control a computer or processor based device to implement aspects detailed herein. The term "article of manufacture" (or alternatively, "computer program product") as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Typically, object relational mapping (ORM) systems allow software developed in source-level languages to access and manipulate the relational data stored in a relational data storage system. In general, software developers can specify queries or data requests referencing a mapped object model rather than the underlying relational model. The ORM system navigates a relational database, returning query results to the application.

Data can be retrieved from the relational database using eager loading or deferred loading, also referred to as lazy loading. When the ORM system utilizes lazy loading, data is extracted from the database only as the data is required. For example, loading of order data associated with a customer is deferred until the application program execution refers to the customer orders (e.g., Customer.Orders). However, loading objects from a database is subject to long latencies due to communication delays and database query processing times. Latency can be reduced by pre-fetching or eager loading specified objects together. For instance, for eager loading, when customer information is loaded, orders associated with the customer as well as order details related to the order can be loaded.

An ORM can use a combination of eager and lazy loading to optimize data retrieval. Typically, an application controls loading on an individual query basis. This ad hoc approach to loading does not lend itself to efficient processing and can lead to inconsistencies. For example, if it is desirable to load orders associated with a customer every time customer data is retrieved, a query must be specified to retrieve orders associated a customer in conjunction with every a query that retrieves a customer.

In addition, large amounts of unnecessary data can be retrieved. Databases can include records dating from the creation of the database. However, only the most recent information may be useful on a daily basis. For example, a query requesting retrieval of customer orders in an inventory database may return orders for several years. However, only the previous three months worth of orders may be relevant. Individual queries can be specified to limit the retrieved data. However, such limitations are typically individual to a specific query, resulting in data inconsistencies. For example, a query that retrieves information for customers from London could load orders associated with that customer for the current month. At the same time, a query for information regarding customers served by a particular sales representative could load related orders for the current year. There is a potential for inconsistency in data due to the potential overlap between the two sets of customers.

Data retrieval can be optimized using a set of defined policies that manage or regulate database queries. This set of policies is referred to herein as a data shape. The data shape can provide a consistent view of the data that can be utilized by an application to increase data retrieval efficiency.

Referring now to FIG. 1, a system 100 that facilitates efficient retrieval of data is illustrated. The system 100 includes a query generation component 102 that can utilize a data shape 104 to interpret an input query and generate a modified query set. The data retrieval policies specified by the data shape 104 can effectively define a view of the underlying database. Based upon the data shape view, the query generation component 102 can generate or modify the provided input query to create a modified query or set of queries that retrieve the appropriate data. For example, a modified query set can include additional queries that extract related data for eager loading and/or a modified query or queries that limit or filter data to be retrieved.

The data shape 104 can be applied across multiple queries to ensure consistency and efficiency of data retrieval among queries. A data shape 104 allows standardization of data retrieval. Once defined, a data shape 104 can be reused, effectively standardizing the queries to which it is applied.

The query generation component 102 can obtain the data shape 104 from a set of available data shapes 106. Multiple data shapes can be defined and maintained within the data shape set 106. Each data shape 104 can be specified for the particular requirements of the process utilizing the retrieved data. The ability to define and utilize multiple data shapes provides tremendous flexibility. At the same time, use of a data shape 104 for multiple queries standardizes data retrieval.

Figure 2:
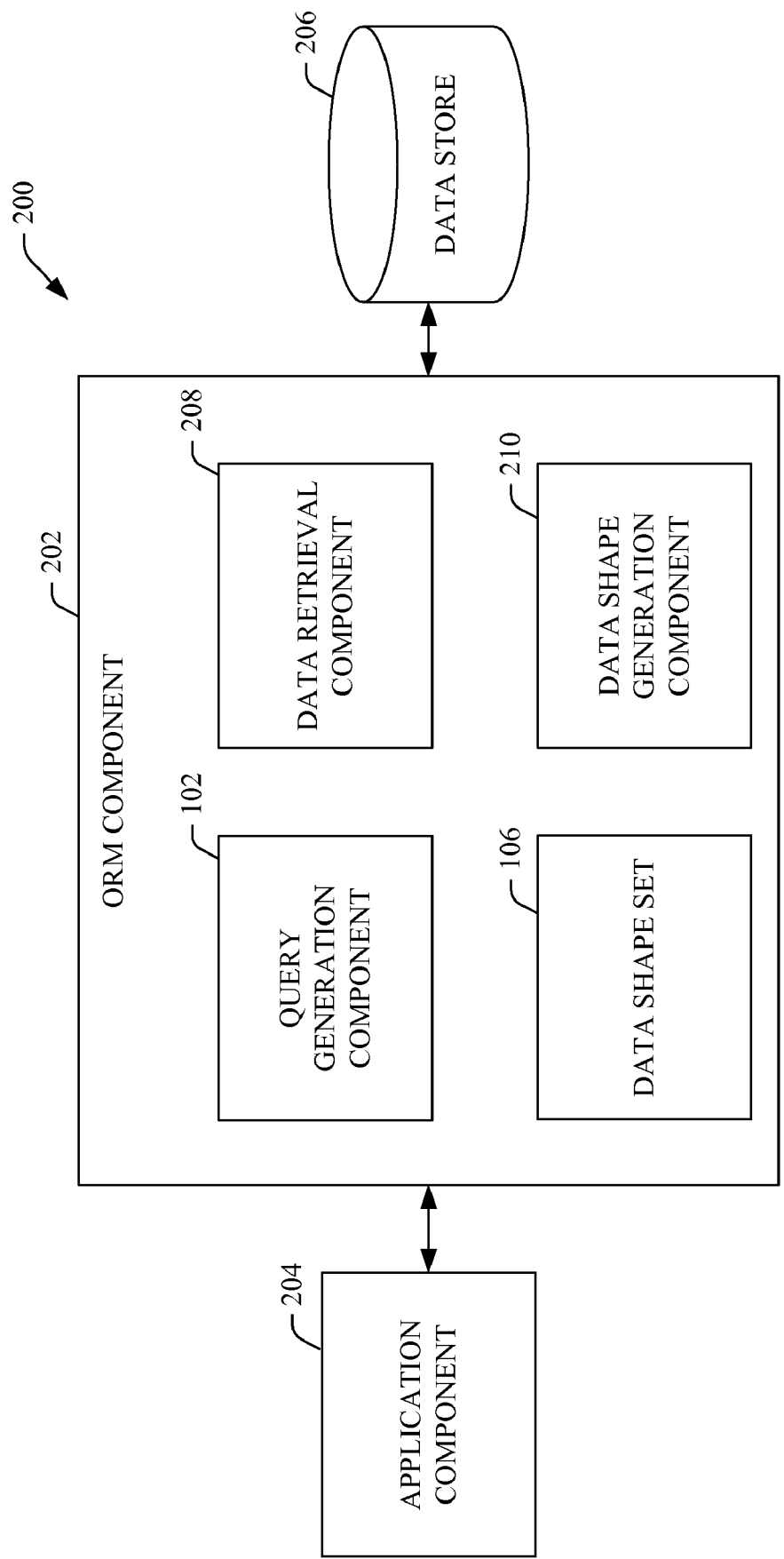
FIG. 2 is a block diagram of a system that facilitates object relational mapping in accordance with an aspect of the subject matter disclosed herein.

Turning now to FIG. 2, a system 200 that performs object relational mapping is illustrated. The system 200 can include an ORM component 202 that acts as an interface between an application component 204 and a data storage component 206. Relational data may be retrieved from the data storage component 206 and managed by the ORM component 202 for use by the application component 204. In particular, the ORM component 202 can include a query generation component 102 that manages input queries specified by the application component 204. The queries can be interpreted based upon an applicable data shape maintained in a data shape set 106. The query generation component 102 can produce one or more modified queries that can be used by a data retrieval component 208 to extract data from the data store 206. The extracted data can be provided to the application component 204.

The ORM component 202 can also include a data shape generation component 210 that is capable of specifying a data shape based upon information obtained from the application component 204. The application component 204 can define multiple data shapes for use in obtaining data from the data store 206. Each query provided by the application component can be associated with a single data shape. The query generation component 102 can select and utilize the appropriate data shape for a particular query.

The application component 204 can specify the data retrieval policies a single time, during creation of the data shape, and reuse those policies over multiple queries, rather than on ad hoc basis for each query. The data shape data retrieval policies can be automatically applied across multiple queries. Application component queries can be a language-integrated query (LINQ), an integrated feature of a primary programming language (e.g., C#, Visual Basic . . . ). Alternatively, application component queries can be specified based upon an application programming interface (API).

Figure 3:
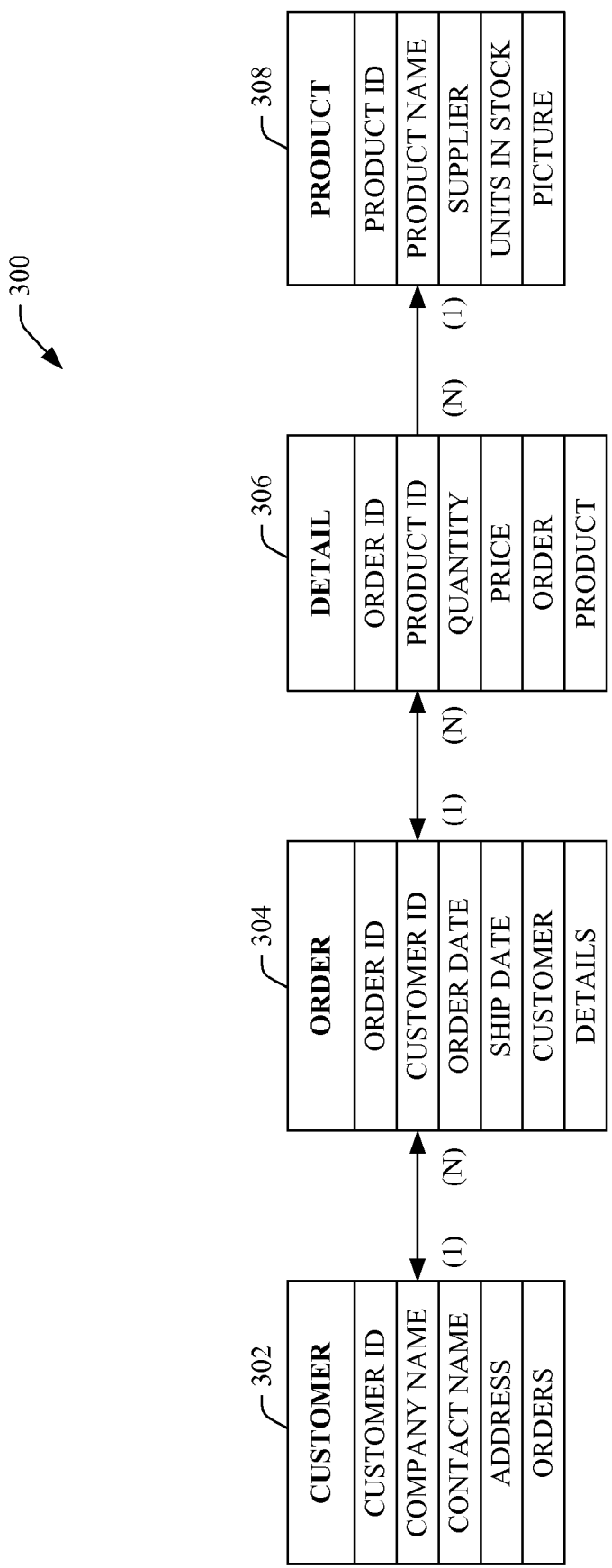
FIG. 3 illustrates an exemplary set of database tables.

Referring now to FIG. 3, an exemplary illustration of a set of database tables 300 is depicted. The database tables 300 describe sales information and relationships used in examples throughout and are useful in demonstrating the concepts described herein. The set of tables 300 includes a customer table 302 including associated data, such as customer identifier, name, address and an orders placed by or associated with the customer. An order table 304 includes information related to a particular order, such as an order identifier, order date and shipping date. In addition, the order table 304 includes a reference to a customer associated with the order. An order detail table 306 describes the specifics of a portion of the order. For example, the order detail can describe a product included in the order. Order detail information can include quantity, price, the identifier for the order with which it is associated and a product identifier that specifies a particular product. Finally, a product table 308 includes information that describes a particular product, such as name, supplier, and a perhaps a picture of the product.

An exemplary implementation of the database tables 300 follows:

```
create table CustomerTable (
    CustomerID      integer identity,
    CompanyName     varchar(100),
    CompanyName     varchar(100),
    Address         varchar(100),
    CONSTRAINT PK_CustomerTable PRIMARY KEY (CustomerId)
)
create table OrderTable (
    OrderID         integer identity,
    CustomerID      integer not null,
    OrderDate       DateTime not null,
    ShipDate        DateTime not null,
    CONSTRAINT PK_OrderTable PRIMARY KEY (OrderID),
```

-continued

```
    CONSTRAINT FK_OrderCustomer FOREIGN KEY (CustomerID)
references DivisionTable(CustomerID)
)
create table DetailTable (
    OrderID         integer not null,
    ProductID       integer not null,
    Quantity        integer not null,
    Price           decimal not null,
    CONSTRAINT PK_DetailTable PRIMARY KEY (OrderID,
ProductID),
    CONSTRAINT FK_DetailOrder FOREIGN KEY (OrderID)
references OrderTable(OrderID),
    CONSTRAINT FK_DetailProduct FOREIGN KEY (ProductID)
references ProductTable(ProducID)
)
create table ProductTable (
    ProductID       integer identity,
    ProductName     varchar(100),
    Supplier        varchar(100),
    UnitsInStock    integer not null,
    Picture image,
    CONSTRAINT PK_ProductTable PRIMARY KEY (ProductID)
)
```

Here, a Customer can place zero or more Orders (a one-to-many relationship). Similarly, an order can include multiple order details (one-to many). Finally, there can be many order Details associated with a particular Product.

A set of classes can be mapped to the database tables 300 of FIG. 3. Relationships between classes can be modeled as object references or collections of references. The following exemplary classes can be mapped to the database tables above:

```
class Customer
{
    public int CustomerID;
    public string CompanyName;
    public string ContactName;
    public string Address;
    public EntitySet<Order> Orders;
}
class Order
{
    public int OrderID;
    public int CustomerID;
    public DateTime OrderDate;
    public DateTime ShipDate;
    public EntityRef<Customer> Customer;
    public EntitySet<Detail> Details;
}
class Detail
{
    public int OrderID;
    public int ProductID;
    public int Quantity;
    public decimal Price;
    public EntityRef<Order> Order;
    public EntityRef<Product> Product;
}
class Product
{
    public int ProductID;
    public string ProductName;
    public string Supplier;
    public int UnitsInStock;
    public byte[ ] Picture;
}
```

For brevity, some details are elided and for simplicity, all class members are shown public. External mapping in this example is one to one between class and table. Mapping between class members and table columns and is not shown here.

An application can utilize queries to retrieve data from the database tables 300. In the following exemplary code, a query retrieves a set of customers and their associated orders are loaded on a deferred basis.

```
static void Main(string[] args)
{
    string connectionString = ...;
    // The following line creates an instance of a class derived from
    // the DataContext class
    Northwind db = new Northwind(connectionString);
    var custQuery = from c in db.Customers
                    where c.City == "London"
                    select c;
    foreach (Customer cust in custQuery) {
        foreach (Order ord in cust.Orders) {
            // Orders are defer loaded on reference -
            // One query per customer
            // Each order can be processed here
        }
    }
}
```

Here, the Northwind class is derived from the DataContext, where the DataContext class provides the context into which data is loaded from the database. Typically, a data context used to retrieve data from and update data within the database. The exemplary code creates an instance of a DataContext "db" and uses the DataContext instance to load a collection of customers. In particular, customers from the city of London are loaded. Once customer objects are loaded, related orders for each of the customers can be obtained using deferred loading, also referred to as lazy loading or demand loading. However, as discussed above, data latency involved in for lazy loading can degrade performance.

Data shapes provide the ability regulate data retrieval and manage eager loading to minimize data latencies. Data shapes can include a set of policies that specify eager loading to be performed for various types of data. For example, an eager loading policy can specify that any time customer type data is loaded any orders associated with that customer is loaded. In addition, eager loading policies specified by the data shape are utilized for each query that is associated with the data shape. Moreover, data shapes allow eager loading to be specified declaratively, facilitating code reuse.

Figure 4:
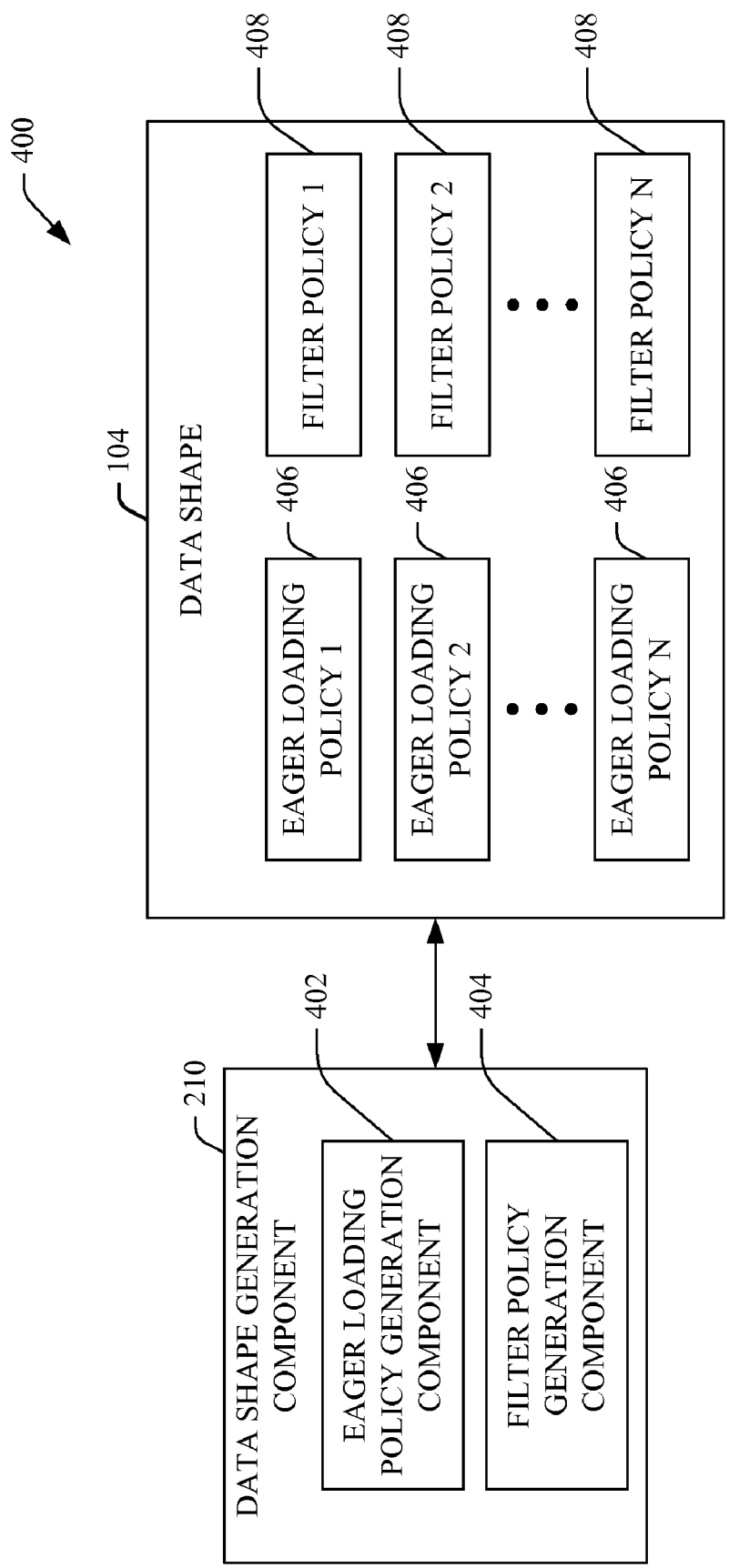
FIG. 4 is a block diagram of a system that generates a data shape for use in enhancing data retrieval in accordance with an aspect of the subject matter disclosed herein.

Turning now to FIG. 4, a system 400 that generates one or more data shapes for use in enhancing data retrieval is illustrated. System 400 can include a data shape generation component 210 creates one or more data shapes that can be utilized to query the database. In general, a data shape 104 is a collection or set of policies that are to be applied to database queries. A data shape can include two types of policies: eager loading policies and filter policies. An eager loading policy regulates eager loading of data from the database, while a filter policy limits or restricts retrieved data.

The data shape generation component 210 includes an eager loading policy generation component 402 that creates eager loading policies. In addition, the data shape generation component 210 includes a filter policy generation component 404 that creates the filter policies. The data shape 104 can include any number (e.g., 0 to N) of eager loading policies 406 and/or filter policies 408. Filtering policies are discussed in further detail below.

An eager loading policy 406 identifies data related to a specific type that is to be loaded when a query retrieves the specified type. For example, orders related to a customer are typically loaded when a customer object is loaded. To minimize latency and roundtrips to the database, a data shape can be defined that includes an eager loading policy for customer type. The policy can require loading of orders associated with a customer, whenever a customer type object is retrieved from the database. The following exemplary code defines a data shape that includes an eager loading policy:

```
DataShape ds = new DataShape( );
ds.SetInclude<Customer>(c => c.Orders);
db.Shape = ds;
```

Here, DataShape "ds" is created and an eager loading policy is defined using a "SetInclude" command. The SetInclude command specifies that when a customer "c" is retrieved, orders associated with the customer object (e.g., "c.Orders") are also retrieved.

The DataShape is then associated with an instance of a DataContext "db." The data context is used to extract data from and update data within a database. The eager loading policy is applied for all queries associated with DataContext "db." For the exemplary code, any query of DataContext "db" that produces a customer type object will automatically generate a query or queries to return orders associated with the customer. The eager loading rule is applied across all queries for the DataContext with which it is associated.

The eager loading generation component 402 can generate multiple eager loading policies 406. Eager loading policies can be applied recursively, such that query results retrieved as the result of an eager loading can trigger another eager loading policy. For example, in addition to the eager loading policy described above regarding customer orders, the data shape can contain an eager loading policy that requires order details to be automatically loaded when an order type object is retrieved. For a data shape including both eager loading policies, a query for a customer type generates a query to retrieve orders for the customer and then generates a query to retrieve order details related to each of the retrieved orders.

The data shape generation component 210 can also include a filter policy generation component 404 that can create multiple filter policies 408. A filter policy 408 can filter or limit the data returned for a query. Frequently, a database can include a large volume of information that is not useful to the application. For example, a database may store orders for many years. However, only those orders from the current fiscal year may be of interest to a particular application. Loading of orders, whether eager or deferred, will likely load unnecessary data resulting in excess data transfers and memory usage. A filter policy 408 can limit queries for specific objects.

A data shape can include both eager loading and filter policies. The policies can work in combination. The following exemplary code defines a data shape including both an eager loading policy and a filter policy that limits the retrieved data:

```
DataShape ds = new DataShape( );
ds.SetInclude<Customer>(c => c.Orders);
ds.SetSubquery<Customer>(c =>
    c.Orders.Where(o => o.OrderDate.Year > 2005));
db.Shape = ds;
```

Here, "SetInclude" defines an eager loading policy that retrieves Orders associated with a customer whenever a customer object is retrieved. "SetSubquery" defines a filter policy that limits orders to those dated 2006 or later. The filter policy will apply to eager loaded data. In addition, the filter policy will apply equally to any instances of deferred loading.

Figure 5:
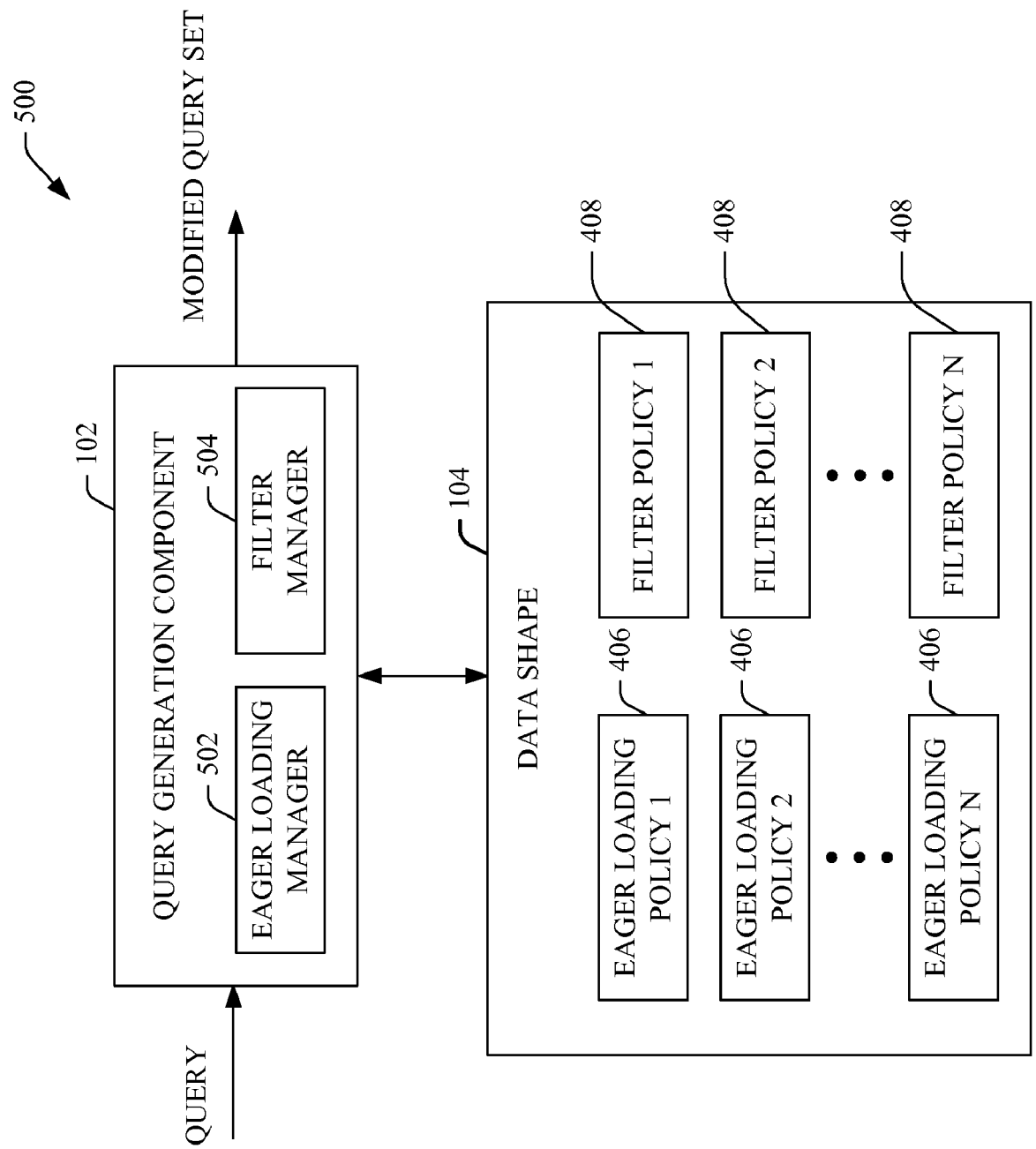
FIG. 5 is a block diagram of a system that facilitates retrieval of data utilizing a data shape in accordance with an aspect of the subject matter disclosed herein.

FIG. 5 illustrates a system 500 that facilitates retrieval of data utilizing one or more data shapes. A single data shape 104 with a plurality of policies is depicted for brevity. The query generation component 102 can include an eager loading manager 502 that can analyze any eager loading policies 406 for the data shape 104 and generate any queries necessary to eager load the specified data. Referring once again to the customer order eager loading policy where orders related to a customer are automatically retrieved when a customer is loaded, the query generation component 102 generates an additional query to retrieve orders associated with the customer any time an input query retrieves a customer. Accordingly, a single input query can result in generation of a set of queries based upon eager loading policies defined for the data shape. For example, in addition to the eager loading policy described above regarding customer orders, the data shape can contain an eager loading policy that requires order details to be automatically loaded when an order type object is retrieved. For a data shape including both eager loading policies, an input query for a customer type causes the query generation component 102 to generate a query to retrieve orders for the customer and queries to retrieve order details related to each of the retrieved orders.

The query generation component 102 can also include a filter policy manager 504 that can analyze any filter policies 408 for a data shape 104 and modify queries based upon such policies. Filter policies specify limits or restrictions on data to be returned in a query. These limits can be applied to the original input query or to any query generated based upon an eager loading policy. Filter policies apply equally to eager loading and to deferred loading.

Specification of filter policies in a data shape ensures consistency of queries. Filter policies for a data shape are associated with an instance of a data context. Accordingly, the filter policies apply to all queries for the data context with which the policy is associated. This ensures that for a particular data context, the view of the data is consistent regardless of which query produced the data. Consider the following filter policies for a data context "db" and two queries executed using the same data context:

```
DataShape ds = new DataShape( );
ds.SetInclude<Customer>(c => c.Orders);
ds.SetSubquery<Customer>(c =>
    c.Orders.Where(o => o.OrderDate.year > 2005));
db.Shape = ds;
var custQuery1 = from c in db.Customers
    where c.City == "London"
    select c;
var custQuery2 = from c in db.Customers
    where c.Orders.Any( )
    select c;
```

The first query, custQuery1, retrieves or queries customers with a London address and the second query, custQuery2, queries customers that have placed or are associated with at least one order. There is possibility or even likelihood that there is overlap between the results of the two queries. If a filter policy were to be specified in an ad hoc manner, such that the policy applied only to the first query, there would be potential inconsistency. Some customers in one set or the other would not have the same filter or subquery applied to them. Such inconsistency can cause errors in applications that rely on such a query mechanism. However, the use of a data shape addresses this problem. Since the same filter or subquery is applied to both the queries, inconsistency is avoided. Regardless of which query loaded a customer's data, the related orders will be only those dated 2006 or later.

To ensure consistency, once the first query is executed for a data context instance, the data shape associated with the data context cannot be altered. This constraint ensures that consistency is maintained throughout the lifetime of the data context instance. This constraint prevents programming errors where the subquery is inconsistently specified or inadvertently changed during the lifetime of a data context. Effectively, a data shape provides a way to establish a dynamic client-side "view" of the related data in a declarative fashion. This view is consistent across all queries.

Figure 6:
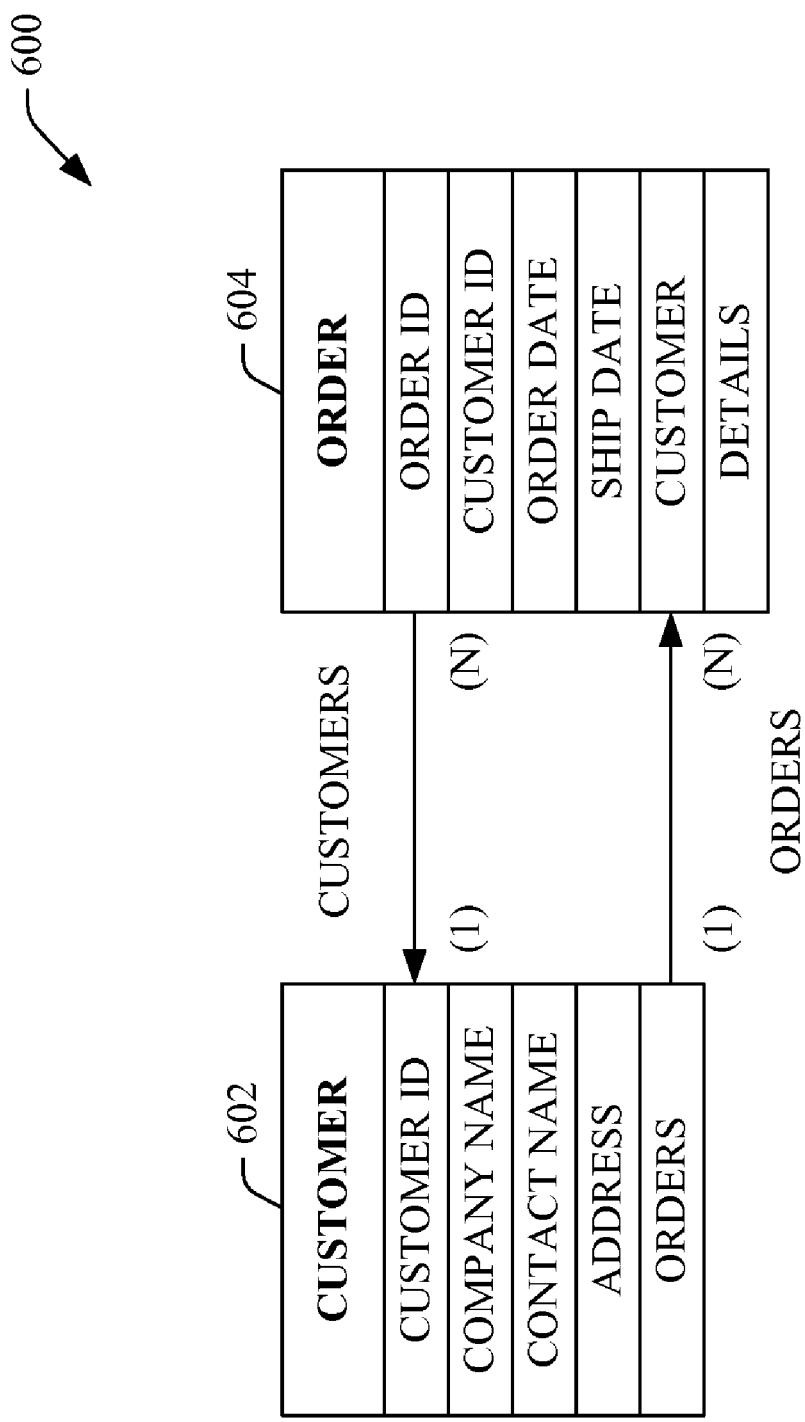
FIG. 6 illustrates a set of exemplary data tables depicting a cyclical relationship.

Turning now to FIG. 6, a set of exemplary data tables 600 depicting a cyclical relationship is illustrated. Frequently, data maintained in a database includes cyclical relationships. Due to the recursive manner in which data shapes are used to retrieve data, these cyclical relationships can be problematic. Data table set 600 depicts the cyclical relationship between Customer data table 602 and Order data table 604. Each customer has some number of associated orders and each order has a customer associated with the order. The following exemplary code illustrates a possible recursion problem:

```
DataShape ds = new DataShape( );
ds.SetInclude<Customer>(c => c.Orders);     // Forward include
ds.SetInclude<Order>(o => o.Customer);      // Backward include
db.Shape = ds;
```

For data shape "ds" two eager load policies are defined using the SetInclude command. The first eager loading policy extracts any orders associated with a customer (e.g., c=>c.Orders) while the second eager loading policy extracts a customer associated with an order type object (e.g. o=>o.Customer).

Here, if the eager loading policies were blindly followed, query generation would not terminate. A query that loaded customer objects would trigger eager loading of related orders. Loading of the related orders would in turn trigger eager loading of customers associated with the orders. Once again, loading of customers would trigger eager loading of Orders, and so on.

The eager loading manager can handle this type cyclical dependency and prevent infinite recursion. If an object type that has already been referenced during eager loading is encountered, recursion is halted. Thus, starting from a query for customers, related orders will be eager loaded, however an attempt to apply the eager loading policy for customers will be stopped since a query for a customer type already exists. This restriction ensures that the query generation component does not simply continue to generate queries. Accordingly, the number of eager loading policies applied will not exceed the number of different types.

Limiting eager loading to a single instance per type is particularly effective for bi-directional relationships, such as the relationship illustrated in FIG. 6. In the example above, when navigating from a customer instance to the orders associated with the customer and then to the customer associated with the orders, the customer is typically identical to the initial customer. In such cases, the limitation provides necessary data, but prevents infinite recursion.

Figure 7:
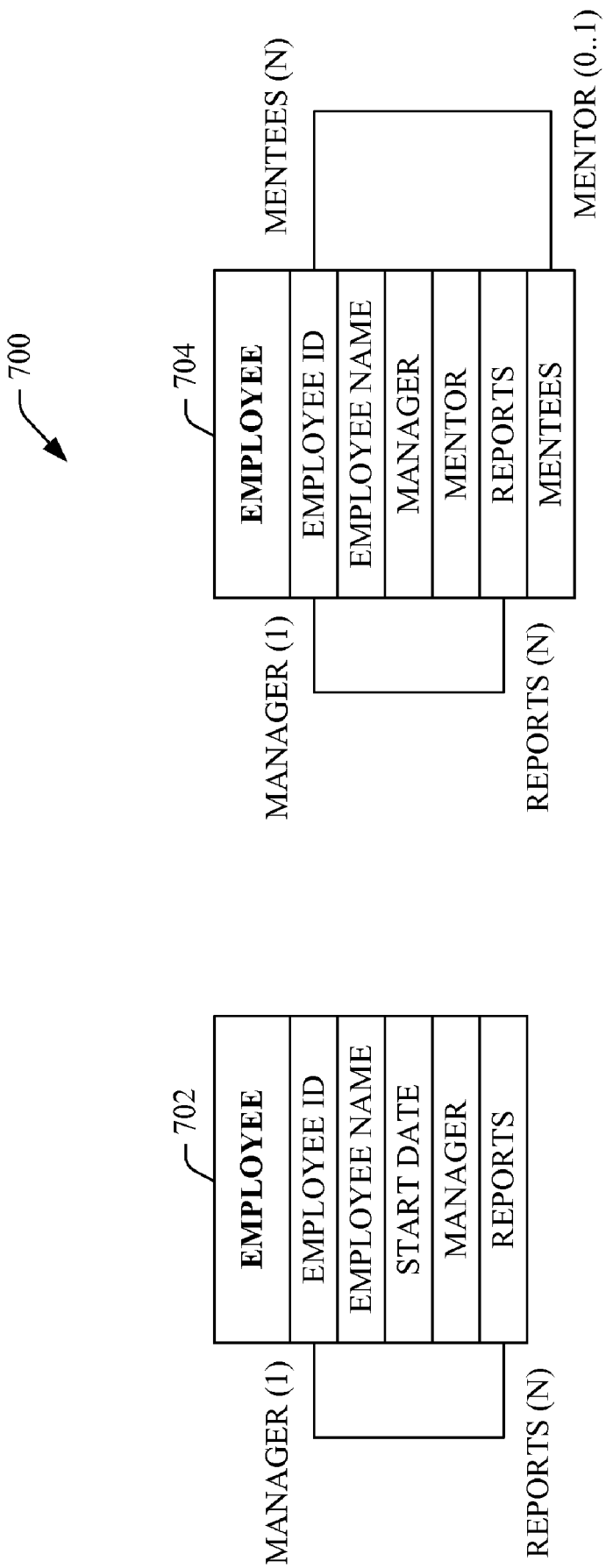
FIG. 7 illustrates a set of exemplary data tables depicting self-recursive relationships.

Referring now to FIG. 7, exemplary data tables 700 depicting self-recursive relationships are illustrated. While type limitation for recursion described above handles cyclical relationships, it does not permit eager loading of self-recursive relationships. However, there are many instances in which such relationships are useful. For example, as shown in database table 702 an employee can have any number of employees who report to him or her. An employee who reports to another employee is referred to herein as a "report." Here, the type is the same for an employee and a report of the employee. Consequently, the type limitation for recursion described above would prevent eager loading of reports associated with an employee. The following exemplary code would be ineffective in performing the desired eager loading:

```
DataShape ds = new DataShape( );
ds.SetInclude<Employee>(e => e.Reports); // Never used!
db.Shape = ds;
```

The eager loading policy defined by the "SetInclude" directive would not be processed since the type retrieved is identical to the initial type.

A recursion depth can be specified to control eager loading of self-recursive relationships while preventing infinite recursion for cyclical relationships. In particular, an eager loading policy for a self-recursive relationship can include a new parameter that explicitly defines the permitted depth of recursion. For instance, a recursion depth of one (1) would indicate that the reports for an employee instance should be loaded when an employee is loaded, while a recursion depth of two (2) would indicate that reports of the employee as well as reports for the retrieved reports should be loaded. The following exemplary code illustrates a directive to retrieve a single level of Reports. In particular, the "SetInclude" method that defines an eager loading policy can be overloaded.

```
DataShape ds = new DataShape( );
ds.SetInclude<Employee>(e => e.Reports, 1); // include 1 level
db.Shape = ds;
```

In addition, the recursion depth can be set to a value of zero (0) to indicate that the recursive relationship should be followed until there are no further related objects available. For an Employee, a recursive depth of zero would indicate that all Reports should be eager loaded until the lowest level of employee, with no Reports of their own, is reached. Depth of zero can be translated directly to recursive query feature of standard query language (SQL) supported by some databases.

Self-recursion processing applies equally well if there are multiple self-recursive relationships. Referring once again to FIG. 7, data table 704 includes a mentor to mentee relationship as well as the reporting relationship depicted in data table 702. The following exemplary data shape specification includes an eager loading policy that follows the report relationship through two levels of recursion. A second eager loading policy follows the mentee relationship through a single level of recursion:

```
DataShape ds = new DataShape( );
ds.SetInclude<Employee>(e => e.Reports, 2); // include 2 levels
ds.SetInclude<Employee>(e => e.Mentees, 1); // include 1 level
db.Shape = ds;
```

In this case, the results of an original query are used to begin the eager loading process and all related objects are loaded with respect to those results. The fact that query results are all of the same type, and therefore retrieved from the same table in the database, is incidental. The depth limitation works uniformly for all relationships regardless of the types of the end-points.

Filtering policies can also be applied to self-recursive eager loading. The following exemplary code defines a filter policy that limits employees to those that started employment on or after Jan. 1, 2006.

```
DataShape ds = new DataShape( );
ds.SetInclude<Employee>(e => e.Reports, 1);
ds.SetSubquery<Employee>(e =>
    e.Reports.Where(r => r.StartDate.Year > 2005));
db.Shape = ds;
```

The filtering policy is applied to the query for employees and the resulting collection of reports is filtered by start date.

A data shape can combine the power of eager loading with the precision of filtering. While eager loading and filtering policies can be used individually, in combination the policies provide tremendous flexibility and control over retrieval of data. A user can control exactly what data gets loaded through filter policies and when the data is loaded (deferred or eager loading). A user can also control how data is configured for a data context instance based upon data shape and can ensure consistency for a given data context instance.

Exemplary signatures for eager loading method (SetInclude) and filtering (SetSubquery) are provided below:

```
public class DataShape {
    public void SetInclude<T>(Expression<Func<T, object>> expression);
    public void SetInclude<T>(Expression<Func<T, object>> expression,
        int level);
    public void SetSubquery<T>(Expression<Func<T,
        object>> expression);
}
```

A data shape can provide a fixed view for a given instance of a DataContext. Applications can utilize multiple data contexts associated with different data shapes. Consequently, an application can utilize multiple views of the underlying data. In the following exemplary code two different data context instances can be declared using differing loading options.

```
Northwind db1 = new Northwind(connection String);
DataShape ds1 = new DataShape( );
// Orders are loaded with Customer.
// Details, Products can be defer loaded
ds1.SetInclude<Customer>(c => c.Orders);
// Only recent Orders are eager loaded
ds1.SetSubquery<Customer>(c =>
    c.Orders.Where(o => o.OrderDate.year > 2005));
```

-continued

```
db1.Shape = ds1;
Northwind db2 = new Northwind(connectionString);
DataShape ds2 = new DataShape( );
// More includes, no subquery
// Products are still defer loaded as needed
ds2.SetInclude<Customer>(c => c.Orders);
ds2.SetInclude<Order>(o => o.Details);
db2.Shape = ds2;
```

Here, the first data shape, "ds1," includes an eager loading policy that loads orders for customers and a filter policy that limits orders to those dated Jan. 1, 2006 or later. The second data shape, "ds2," includes an eager loading policy that loads orders associated with customers and a second eager loading policy that loads details associated with an order. No filter policy is specified for the second data shape. The first data shape is associated with a first data context, "db1," and the second data shape is associated with a second, separate data context, "db2."

Once created, a data shape can be shared by multiple data context instances. For example:

```
Northwind db3 = new Northwind(connectionString);
// Reusing the same DataShape created before
db3.Shape = ds2;
```

Here, a new third data context, "db3," utilizes the same data shape "ds2" as the second database, "db2."

The aforementioned systems have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Additionally, it should be noted that one or more components may be combined into a single component providing aggregate functionality or divided into several sub-components. The components may also interact with one or more other components not specifically described herein but known by those of skill in the art.

Furthermore, as will be appreciated various portions of the disclosed systems above and methods below may include or consist of artificial intelligence or knowledge or rule based components, sub-components, processes, means, methodologies, or mechanisms (e.g., support vector machines, neural networks, expert systems, Bayesian belief networks, fuzzy logic, data fusion engines, classifiers . . . ). Such components, inter alia, can automate certain mechanisms or processes performed thereby to make portions of the systems and methods more adaptive as well as efficient and intelligent.

For purposes of simplicity of explanation, methodologies that can be implemented in accordance with the disclosed subject matter were shown and described as a series of blocks. However, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter. Additionally, it should be further appreciated that the methodologies disclosed throughout this specification are capable of being stored on an article of manufacture to facilitate transporting and transferring such methodologies to computers. The term article of manufacture, as used, is intended to encompass a computer program accessible from any computer-readable device, carrier, or media.

Figure 8:
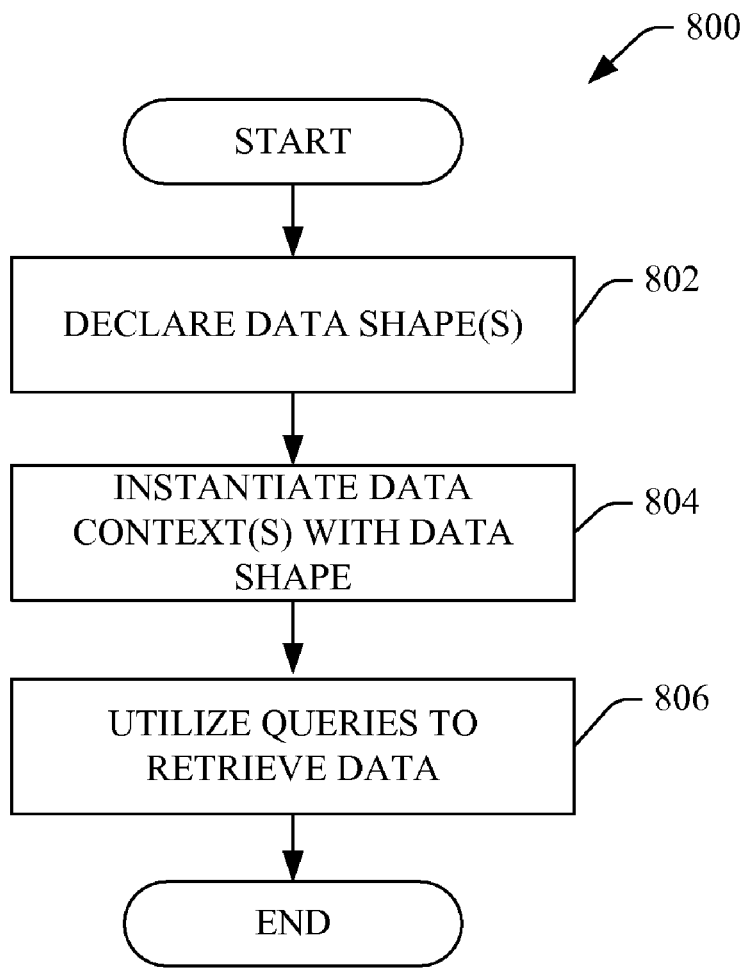
FIG. 8 illustrates a methodology for utilizing data shape capabilities to enhance retrieval of data in accordance with an aspect of the subject matter disclosed herein.

Referring now to FIG. 8, a methodology 800 for utilizing data shape capabilities to enhance retrieval of data is illustrated. At 802, an application program can declare any number of data shapes. Each data shape can include any number (e.g., 0 to N) of eager loading policies and/or any number of filter policies. Filter policies apply to both deferred loading and eager loading. Each data shape effectively provides a separate view of the database. Multiple data shapes can be defined for a single database, such that specific database views can be used for particular purposes. Data shapes can be individualized to meet specific application requirements.

At 804, any number of data contexts can be instantiated using the specified data shapes. Each data context can be associated with only one data shape. Once a data context has retrieved data using a particular data shape, the data shape associated with the data context cannot be changed. This restriction prevents possible data inconsistencies. However, numerous data contexts can utilize the same data shape.

At 806, the application program can utilize queries for a data context to extract data from the database. Each query will automatically be interpreted based upon the data shape associated with the query. In particular, each query can trigger eager loading based upon eager loading policies defined within the data shape. In addition, retrieved data can be limited based upon filter policies specified within the data shape.

Figure 9:
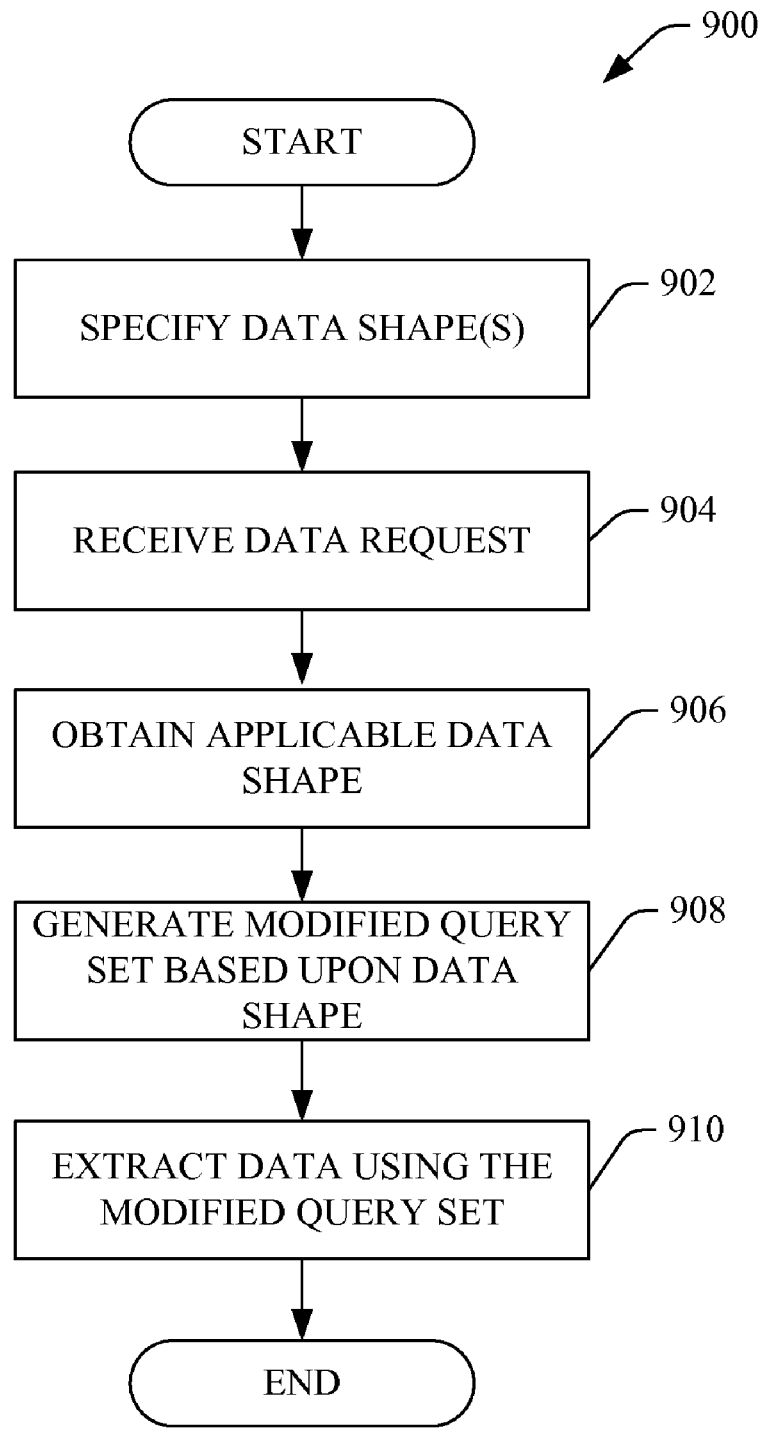
FIG. 9 illustrates a methodology for efficiently managing data retrieval in accordance with an aspect of the subject matter disclosed herein.

Turning now to FIG. 9, a methodology 900 for efficiently managing data retrieval is illustrated. At 902, one or more data shapes can be specified. Each data shape can include any number of eager loading and/or filter policies. The data shape specifications can be analyzed and maintained for use during application processing. A data request or query can be received at 904.

The data shape associated with the query can be determined at 906. Each query is associated with a particular context, which in turn is related to a specific data shape. Accordingly, each query is associated with a single data shape. A modified query set can be generated based upon the data shape at 908. The modified query set can include the original input query. Additional queries can be generated based upon the eager loading policies included in the data shape. The query or queries can be modified based upon limitations defined within any filter policies associated with the data shape. At 910, data can be extracted from the database using the set of modified queries.

Figure 10:
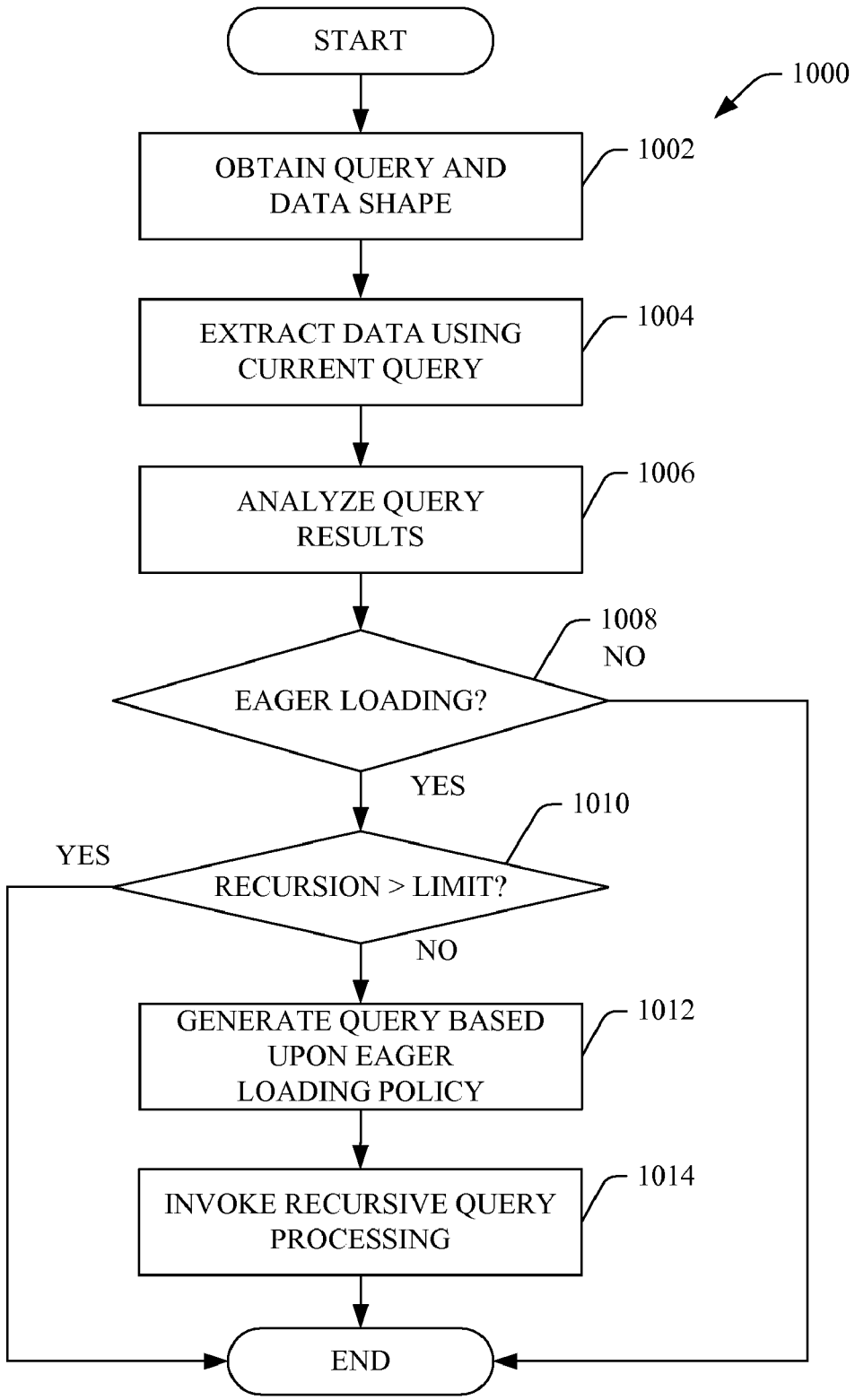
FIG. 10 illustrates a methodology for facilitating eager loading in accordance with an aspect of the subject matter disclosed herein.

Referring now to FIG. 10, a methodology 1000 for facilitating eager loading is illustrated. At 1002, a query and its associated data shape are obtained. The query is used to extract data from the database at 1004. The retrieved data is analyzed at 1006. The resulting data and the data type of query results can be used to determine whether additional data is to be retrieved. Referring once again to the customer order relationship described above, if the original input query retrieves a customer, based upon that customer result type of the input query, orders related to the customer can be extracted from the database. At 1008, a determination is made as to whether eager loading is to be performed. The determination can based upon whether there are any eager loading policies that pertain to the result type of the query as well as the retrieved data. For example, if retrieved data indicates that a customer has no related orders, there is no need to attempt to eager load related orders. If no eager loading is to be performed, the process terminates.

If eager loading is to be performed, a determination can be made as to whether a recursion limit for the result type has been reached 1010. Generally, the recursion limit is reached if the result type has already been processed. This restriction can prevent infinite recursion in cyclic relationships, such as the bidirectional relationship illustrated in FIG. 6. For certain self-recursive relationships, an explicit recursion limit can be specified with the eager loading policy. In such cases, the number of times the type has been processed can be compared to the specified recursion depth to determine if the recursion should be stopped. A recursion depth of zero can indicate that the recursion limit should be disregarded for a self-recursive relationship. In such cases, recursion will terminate once all the available data has been retrieved.

If the recursion limit has been reached, no further eager loading is performed and the process terminates. However, if the recursion limit has not yet been reached, an additional query based upon the eager loading policy is generated at 1012. At 1014, the generated query is used to invoke the methodology 1000 recursively and eager load related data in accordance with the defined eager loading policies. Upon returning from the recursive processing, the process terminates.

Figure 11:
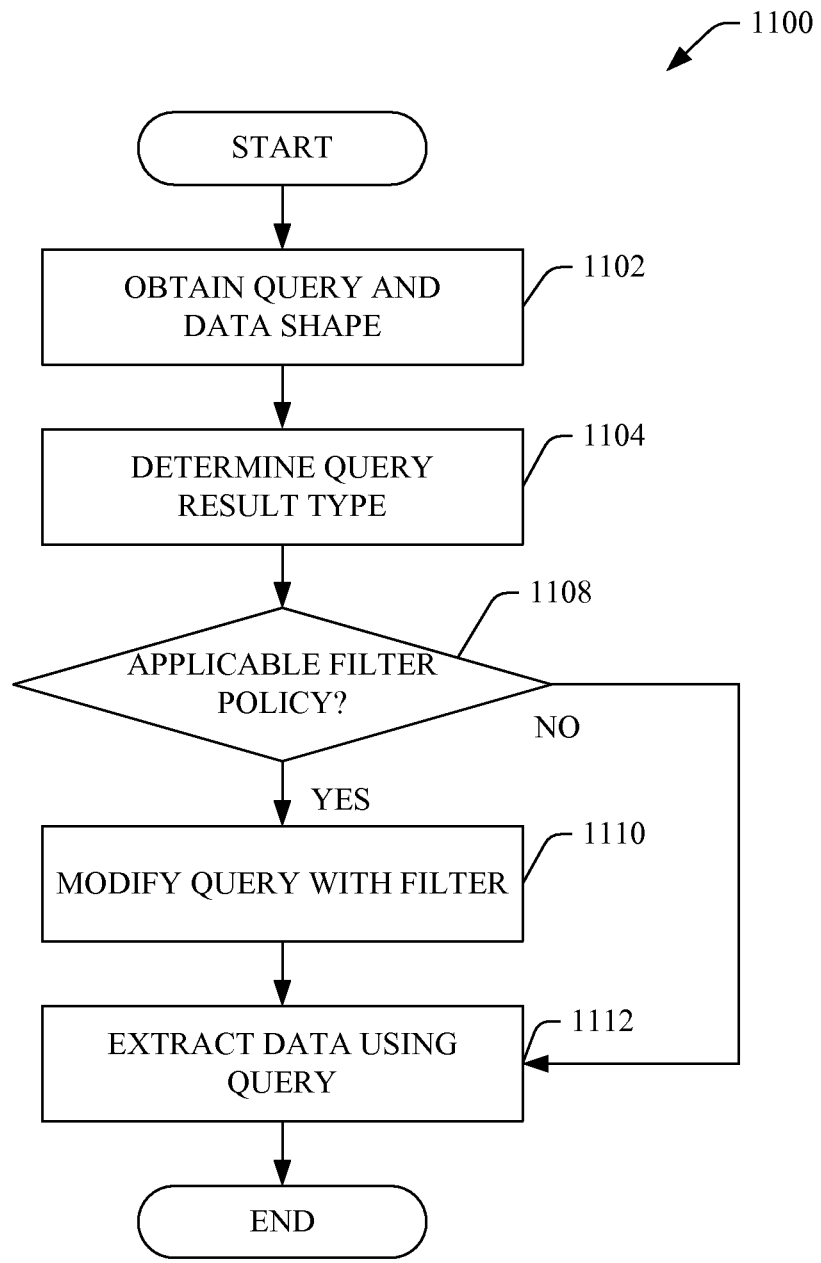
FIG. 11 illustrates a methodology for limiting query results in accordance with an aspect of the subject matter disclosed herein.

Referring now to FIG. 11, a methodology 1100 for limiting query results is illustrated. At 1102, a query and its associated data shape are obtained. The result type of the query is determined at 1104. The result type determines whether a filter policy is applied. For example, for a filter policy that restricts retrieved orders to those placed after Jan. 1, 2006, if the original input query returns orders, then based upon the order result type, the filter policy limitation is applied and only orders with a date of Jan. 1, 2006 or later can be extracted from the database. At 1106, a determination is made as to whether there are any filter policies related to the result type of the query. If no, the current query is used to extract data from the database at 1112.

If there is an applicable filter policy, the query can be modified at 1110. The query can be updated in accordance with the filter policy to limit the data retrieved by the query. The modified query can then be used to extract data from the database at 1112.

Figure 12:
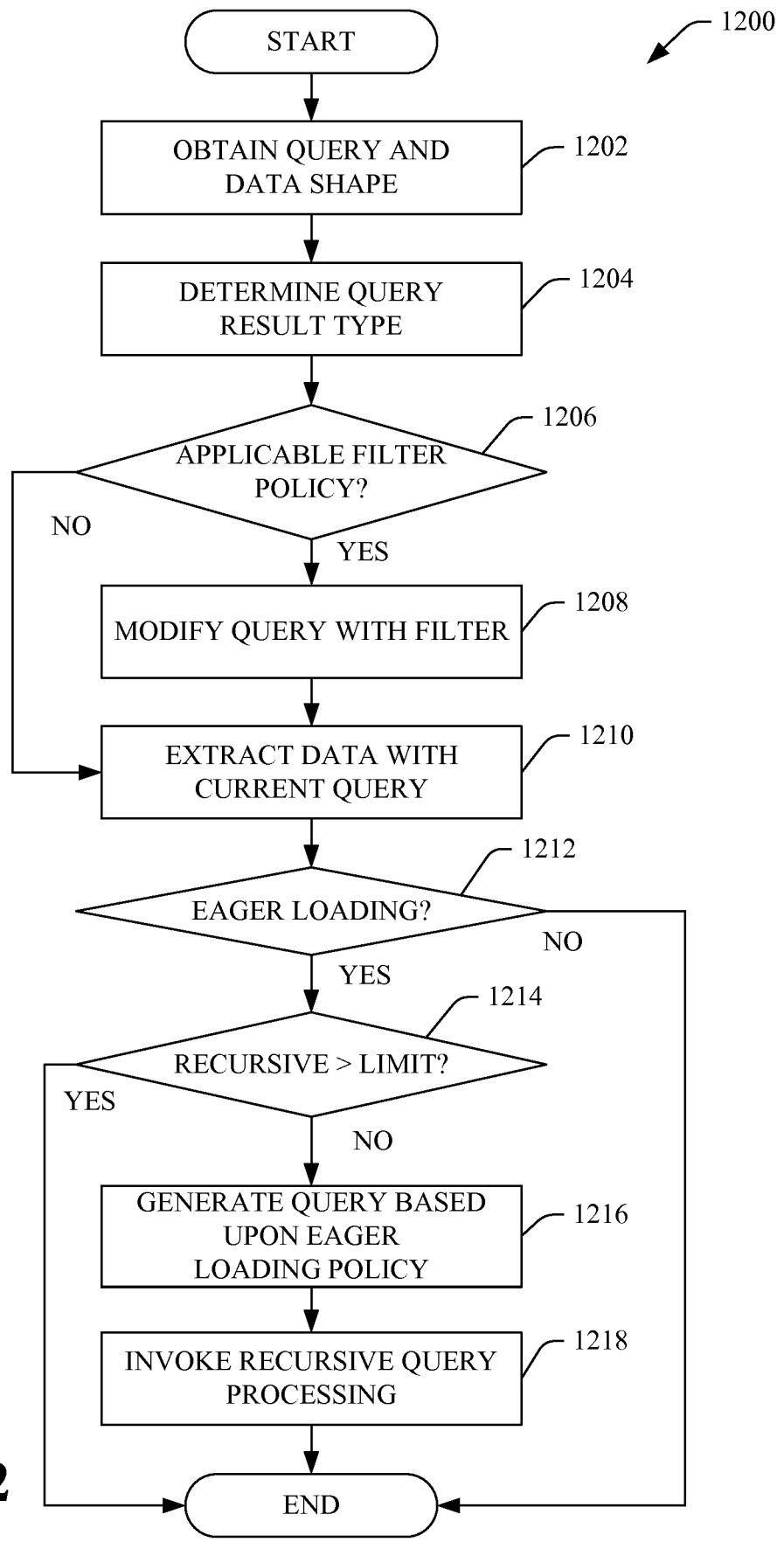
FIG. 12 illustrates a methodology for utilizing eager loading policies and/or filtering policies in accordance with an aspect of the subject matter disclosed herein.

Turning now to FIG. 12, a methodology 1200 for utilizing eager loading policies and filtering policies is illustrated. At 1202, a query and its associated data shape are obtained. The result type of the query is determined at 1204. The result type determines whether eager loading and filter policies are applied. At 1206, a determination is made as to whether there are any filter policies related to the result type of the query. If no, the current query is used to extract data from the database at 1210. If there is an applicable filter policy, the current query can be modified at 1208. The query can be updated in accordance with the filter policy to limit data retrieved by the query. The modified current query can then be used to extract data from the database at 1210.

At 1212, a determination is made as to whether eager loading is to be performed. The determination can be based upon whether there are eager loading policies that pertain to the result type of the query as well as data retrieved by the query. If it is determined that eager loading will not be performed, the process terminates. If eager loading is to be performed, a determination can be made as to whether the recursion limit for the result type has been reached 1214. As described above with respect to FIG. 10, the recursion limit is typically reached if the result type has already been processed, preventing infinite recursion in cyclic relationships. For certain self-recursive relationships, the recursion limit can be explicitly specified in the eager loading policy. In such cases, the number of times the type has been processed can be compared to the specified recursion depth to determine if the recursion limit has been reached. A recursion depth of zero can indicate that the recursion limit should be disregarded for a self-recursive relationship. In such cases, recursion will terminate once all the available data has been retrieved.

If the recursion limit has been reached, no further eager loading is performed and the process terminates. However, if the recursion limit has not been reached, an additional query is generated at 1216. At 1218, the generated query is used to invoke the methodology 1200 recursively and eager load related data in accordance with the defined eager loading policies.

Figure 13:
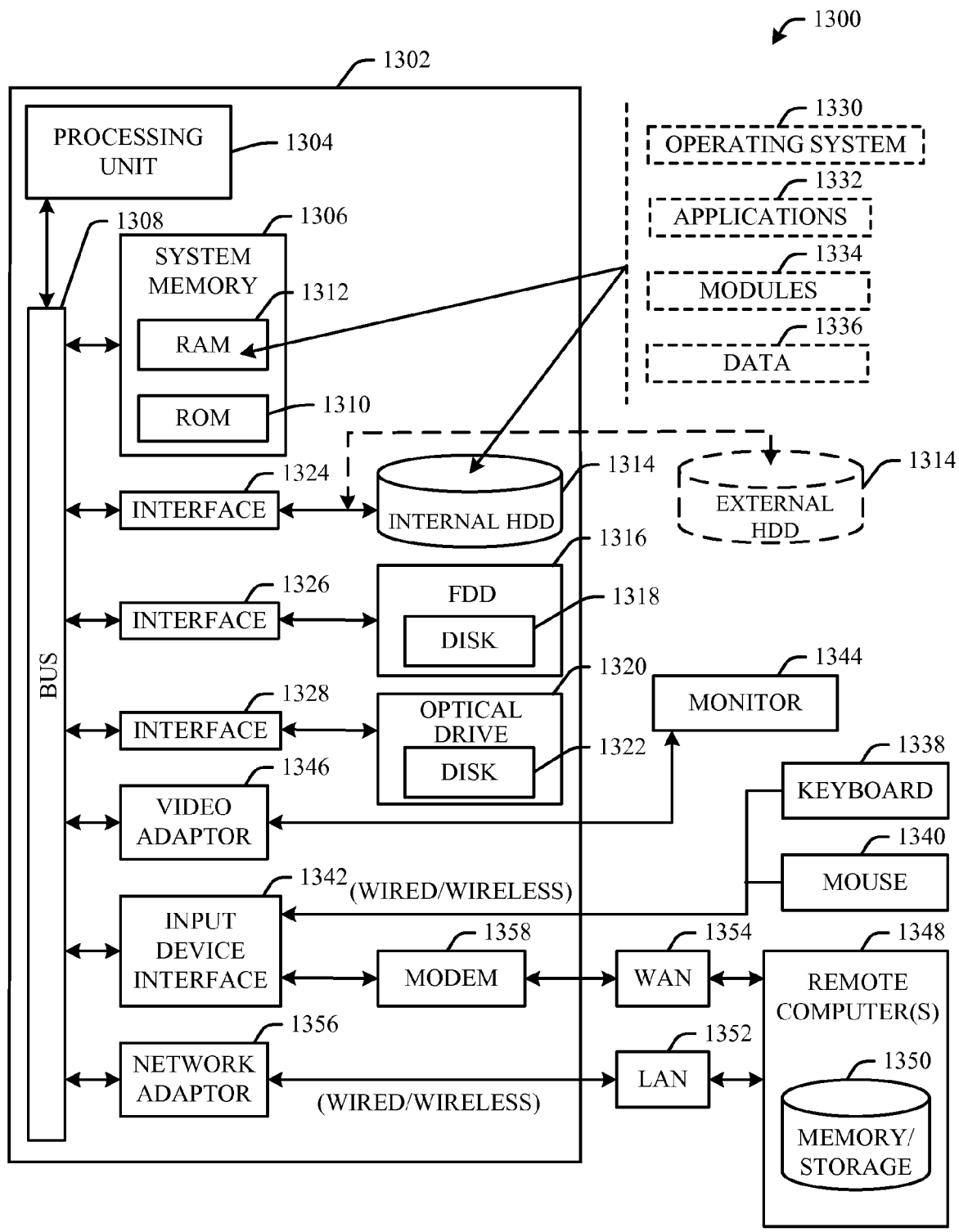
FIG. 13 is a schematic block diagram illustrating a suitable operating environment.
Figure 14:
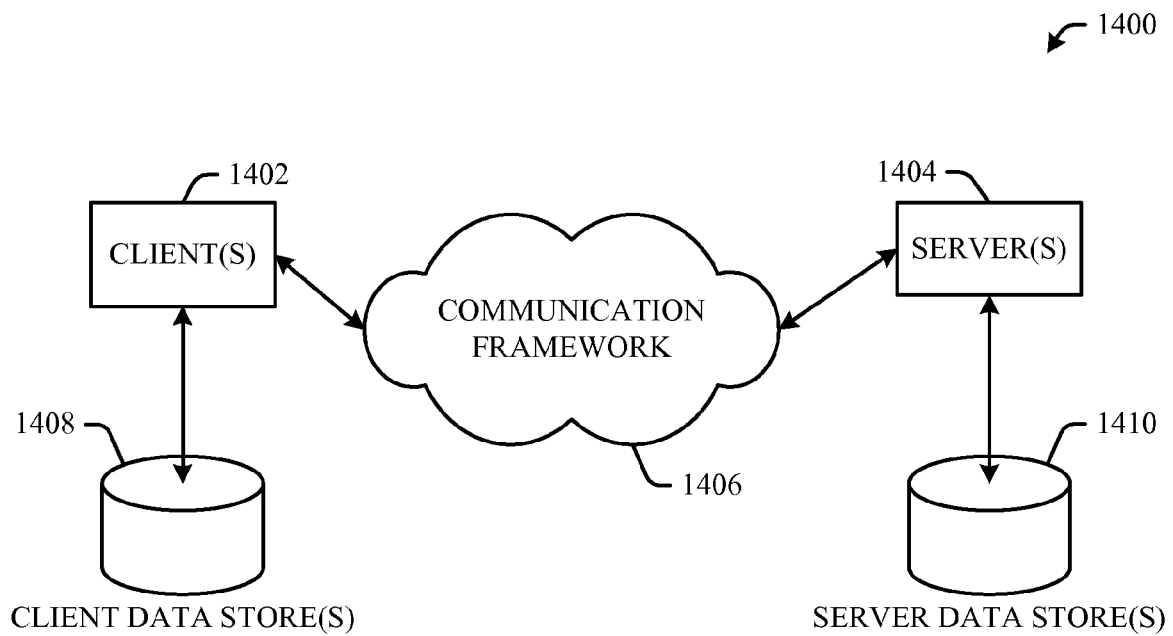
FIG. 14 is a schematic block diagram of a sample-computing environment.

In order to provide a context for the various aspects of the disclosed subject matter, FIGS. 13 and 14 as well as the following discussion are intended to provide a brief, general description of a suitable environment in which the various aspects of the disclosed subject matter may be implemented. While the subject matter has been described above in the general context of computer-executable instructions of a computer program that runs on a computer and/or computers, those skilled in the art will recognize that the system and methods disclosed herein also may be implemented in combination with other program modules. Generally, program modules include routines, programs, components, data structures, etc. that perform particular tasks and/or implement particular abstract data types. Moreover, those skilled in the art will appreciate that the inventive methods may be practiced with other computer system configurations, including single-processor or multiprocessor computer systems, mini-computing devices, mainframe computers, as well as personal computers, hand-held computing devices (e.g., personal digital assistant (PDA), phone, watch . . . ), microprocessor-based or programmable consumer or industrial electronics (e.g., personal media players, television set top boxes, digital video recorders, video game systems) and the like. The illustrated aspects may also be practiced in distributed computing environments where tasks are performed by remote processing devices that are linked through a communications network. However, some, if not all aspects of the systems and methods described herein can be practiced on stand-alone computers. In a distributed computing environment, program modules may be located in both local and remote memory storage devices.

With reference again to FIG. 13, the exemplary environment 1300 for implementing various aspects of the embodiments includes a mobile device or computer 1302, the computer 1302 including a processing unit 1304, a system memory 1306 and a system bus 1308. The system bus 1308 couples system components including, but not limited to, the system memory 1306 to the processing unit 1304. The processing unit 1304 can be any of various commercially available processors. Dual microprocessors and other multi-processor architectures may also be employed as the processing unit 1304.

The system memory 1306 includes read-only memory (ROM) 1310 and random access memory (RAM) 1312. A basic input/output system (BIOS) is stored in a non-volatile memory 1310 such as ROM, EPROM, EEPROM, which BIOS contains the basic routines that help to transfer information between elements within the computer 1302, such as during start-up. The RAM 1312 can also include a high-speed RAM such as static RAM for caching data.

The computer or mobile device 1302 further includes an internal hard disk drive (HDD) 1314 (e.g., EIDE, SATA), which internal hard disk drive 1314 may also be configured for external use in a suitable chassis (not shown), a magnetic floppy disk drive (FDD) 1316, (e.g., to read from or write to a removable diskette 1318) and an optical disk drive 1320, (e.g., reading a CD-ROM disk 1322 or, to read from or write to other high capacity optical media such as the DVD). The hard disk drive 1314, magnetic disk drive 1316 and optical disk drive 1320 can be connected to the system bus 1308 by a hard disk drive interface 1324, a magnetic disk drive interface 1326 and an optical drive interface 1328, respectively. The interface 1324 for external drive implementations includes at least one or both of Universal Serial Bus (USB) and IEEE 1194 interface technologies. Other external drive connection technologies are within contemplation of the subject systems and methods.

The drives and their associated computer-readable media provide nonvolatile storage of data, data structures, computer-executable instructions, and so forth. For the computer 1302, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods for the embodiments of the data management system described herein.

A number of program modules can be stored in the drives and RAM 1312, including an operating system 1330, one or more application programs 1332, other program modules 1334 and program data 1336. All or portions of the operating system, applications, modules, and/or data can also be cached in the RAM 1312. It is appreciated that the systems and methods can be implemented with various commercially available operating systems or combinations of operating systems.

A user can enter commands and information into the computer 1302 through one or more wired/wireless input devices, e.g. a keyboard 1338 and a pointing device, such as a mouse 1340. Other input devices (not shown) may include a microphone, an IR remote control, a joystick, a game pad, a stylus pen, touch screen, or the like. These and other input devices are often connected to the processing unit 1304 through an input device interface 1342 that is coupled to the system bus 1308, but can be connected by other interfaces, such as a parallel port, an IEEE 1194 serial port, a game port, a USB port, an IR interface, etc. A display device 1344 can be used to provide a set of group items to a user. The display devices can be connected to the system bus 1308 via an interface, such as a video adapter 1346.

The mobile device or computer 1302 may operate in a networked environment using logical connections via wired and/or wireless communications to one or more remote computers, such as a remote computer(s) 1348. The remote computer(s) 1348 can be a workstation, a server computer, a router, a personal computer, portable computer, microprocessor-based entertainment appliance, a peer device or other common network node, and typically includes many or all of the elements described relative to the computer 1302, although, for purposes of brevity, only a memory/storage device 1350 is illustrated. The logical connections depicted include wired/wireless connectivity to a local area network (LAN) 1352 and/or larger networks, e.g. a wide area network (WAN) 1354. Such LAN and WAN networking environments are commonplace in offices and companies, and facilitate enterprise-wide computer networks, such as intranets, all of which may connect to a global communications network, e.g., the Internet.

When used in a LAN networking environment, the computer 1302 is connected to the local network 1352 through a wired and/or wireless communication network interface or adapter 1356. The adaptor 1356 may facilitate wired or wireless communication to the LAN 1352, which may also include a wireless access point disposed thereon for communicating with the wireless adaptor 1356.

When used in a WAN networking environment, the computer 1302 can include a modem 1358, or is connected to a communications server on the WAN 1354, or has other means for establishing communications over the WAN 1354, such as by way of the Internet. The modem 1358, which can be internal or external and a wired or wireless device, is connected to the system bus 1308 via the serial port interface 1342. In a networked environment, program modules depicted relative to the computer 1302, or portions thereof, can be stored in the remote memory/storage device 1350. It will be appreciated that the network connections shown are exemplary and other means of establishing a communications link between the computers can be used.

The computer 1302 is operable to communicate with any wireless devices or entities operatively disposed in wireless communication, e.g., a printer, scanner, desktop and/or portable computer, PDA, communications satellite, any piece of equipment or location associated with a wirelessly detectable tag (e.g. a kiosk, news stand, restroom), and telephone. The wireless devices or entities include at least Wi-Fi and Bluetooth™ wireless technologies. Thus, the communication can be a predefined structure as with a conventional network or simply an ad hoc communication between at least two devices.

Wi-Fi allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11(a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

FIG. 14 is a schematic block diagram of a sample-computing environment 1400 with which the systems and methods described herein can interact. The system 1400 includes one or more client(s) 1402. The client(s) 1402 can be hardware and/or software (e.g. threads, processes, computing devices). The system 1400 also includes one or more server(s) 1404. Thus, system 1400 can correspond to a two-tier client server model or a multi-tier model (e.g., client, middle tier server, data server), amongst other models. The server(s) 1404 can also be hardware and/or software (e.g., threads, processes, computing devices). One possible communication between a client 1402 and a server 1404 may be in the form of a data packet adapted to be transmitted between two or more computer processes. The system 1400 includes a communication framework 1406 that can be employed to facilitate communications between the client(s) 1402 and the server(s) 1404.

The client(s) 1402 are operably connected to one or more client data store(s) 1408 that can be employed to store information local to the client(s) 1402. Similarly, the server(s) 1404 are operably connected to one or more server data store(s) 1410 that can be employed to store information local to the servers 1404.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications and variations that fall within the spirit and scope of the appended claims. Furthermore, to the extent that the terms "includes," "has" or "having" are used in either the detailed description or the claims, such terms are intended to be inclusive in a manner similar to the term "comprising" as "comprising" is interpreted when employed as a transitional word in a claim.

What is claimed is:

1. A computer-implemented system that facilitates management of data store queries, through use of data shapes that include eager loading policies and filter policies that are applied to the data store queries, to provide a consistent view of a data store and to increase data retrieval efficiency, comprising:
   a processor; and
   one or more physical computer readable storage media operatively coupled to the processor, the computer readable storage media having stored thereon computer executable instructions that, when executed by the processor, implement the following components:
      a data shape generation component that generates at least one data shape based at least in part upon a specification, wherein the specification includes at least one eager loading policy that directs eager loading of data, and at least one filter policy that is configured to restrict queries, and wherein the data shape includes the eager loading policy and the filter policy;
      a data shape set component that maintains a data shape set that enables data shapes to be applied across multiple queries, wherein the data shape set is capable of maintaining a plurality of data shapes, including the data shape;
      a query generation component that receives the input query requesting data from the data store and, in response, obtains the data shape from the data shape set component, determines a consistent data view associated with the input query from at least the eager loading policy and the filter policy, and generates a plurality of output queries used to retrieve the data from the data store, wherein at least one output query of the plurality is generated based the eager loading policy, and wherein at least one output query of the plurality includes at least one restriction based on the filter policy; and
      a data retrieval component that executes the plurality of output queries to retrieve the data from the data store in accordance with the consistent data view.

2. The computer-implemented system of claim 1, further comprising an eager loading manager component that applies the eager loading policy recursively, wherein the plurality of output queries is based upon recursive application of the eager loading policy.

3. The computer-implemented system of claim 2, wherein the eager loading manager prevents infinite recursion during the application of the loading policy.

4. The computer-implemented system of claim 3, wherein the eager loading policy includes an explicit recursion limit that restricts a number of levels of recursion applied by the eager loading manager.

5. The computer-implemented system of claim 1, further comprising a filter policy manager component that applies the restriction defined by the filter policy.

6. The computer-implemented system of claim 1, wherein the eager loading policy is applied recursively, and wherein the plurality of output queries is based upon recursive application of the eager loading policy and recursive application of the restriction defined by the filter policy.

7. A method implemented by a computing system that includes a processor and memory storing instructions which, when executed by the processor, implement the method for facilitating management of data store queries, through use of data shapes that include eager loading policies and filter policies that may be applied to the data store queries, to provide a consistent view of a data store and to increase data retrieval efficiency, the method comprising acts of:
   receiving a specification that includes at least one pre-fetching policy that directs pre-fetching of data, and at least one subquery policy that is configured to restrict one or more query;
   generating at least one data shape based in part upon the specification, the data shape including the pre-fetching policy and the subquery policy;
   storing the data shape in a data shape set that is capable of maintaining a plurality of data shapes, wherein the data shape set enables data shapes to be applied across multiple queries;
   receiving an input query requesting data from the data store;
   obtaining the data shape from the data shape set;
   determining a consistent data view associated with the input query from at least the pre-fetching policy and the subquery policy;
   generating a plurality of output queries used to retrieve the data from the data store, wherein at least one query of the plurality is generated based on the pre-fetching policy, and wherein at least one query of the plurality includes at least one restriction based on the subquery policy; and
   executing the plurality of output queries to retrieve the data from the data store in accordance with the consistent data view.

8. The computer-implemented method of claim 7, further comprising applying the pre-fetching policy recursively, wherein the plurality of output queries are based upon recursive application of the pre-fetching policy.

9. The computer-implemented method of claim 8, further comprising:
   determining if a recursion limit has been exceeded; and
   terminating recursive application of the pre-fetching policy when the recursion limit is reached.

10. The computer-implemented method of claim 7, wherein the input query is a function of the subquery policy.

11. A computer program product comprising one or more physical computer readable storage media having stored thereon computer executable instructions that, when executed by a processor, perform the computer implemented method of claim 7.

12. The computer-implemented system of claim 1, wherein the plurality of output queries includes the input query.

13. The computer-implemented system of claim 1, wherein the all queries in the plurality of output queries includes the at least one restriction based on the filter policy.

14. The computer-implemented system of claim 1, wherein the data shape is associated with a data context and the input query is executed within the data context, and wherein once the input query has been executed within the data context the data shape cannot be altered, ensuring a consistent view of the data store to any subsequent input queries executed within the data context.

15. The computer-implemented system of claim 1, wherein at least one query of the plurality uses deferred loading, and wherein the at least one query of the plurality that uses deferred loading includes the at least one restriction based on the filter policy.

16. The computer-implemented method of claim 7, wherein the plurality of output queries includes the input query.

17. The computer-implemented method of claim 7, wherein the all queries in the plurality of output queries includes the at least one restriction based on the subquery policy.

18. The computer-implemented method of claim 7, wherein the data shape is associated with a data context and the input query is executed within the data context, and wherein once the input query has been executed within the data context the data shape cannot be altered, ensuring a consistent view of the data store to any subsequent input queries executed within the data context.

19. The computer-implemented method of claim 7, wherein at least one query of the plurality uses deferred loading, and wherein the at least one query of the plurality that uses deferred loading includes the at least one restriction based on the subquery policy.

\* \* \* \* \*